United States Patent
Kwon et al.

(10) Patent No.: US 11,313,763 B2
(45) Date of Patent: Apr. 26, 2022

(54) ENGINE SYNCHRONIZATION SYSTEM AND CONTROL METHOD THEREOF

(71) Applicants: HYUNDAI MOTOR COMPANY, Seoul (KR); KIA MOTORS CORPORATION, Seoul (KR)

(72) Inventors: Hyeok-Jun Kwon, Seoul (KR); Chang-Jin Oh, Suwon-si (KR); Chang-Hyun Lim, Hwaseong-si (KR); Jung-Suk Han, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 228 days.

(21) Appl. No.: 16/685,102

(22) Filed: Nov. 15, 2019

(65) Prior Publication Data
US 2020/0284692 A1 Sep. 10, 2020

(30) Foreign Application Priority Data
Mar. 6, 2019 (KR) .................. 10-2019-0025743

(51) Int. Cl.
| | |
|---|---|
| *G06F 1/00* | (2006.01) |
| *G01M 15/06* | (2006.01) |
| *F02D 43/00* | (2006.01) |
| *F02N 19/00* | (2010.01) |
| *F02D 41/00* | (2006.01) |

(52) U.S. Cl.
CPC ............ *G01M 15/06* (2013.01); *F02D 43/00* (2013.01); *F02N 19/005* (2013.01); *F02D 2041/0092* (2013.01); *F02N 2200/021* (2013.01)

(58) Field of Classification Search
CPC ......... B60W 10/06; B60W 2510/0623; B60W 2710/0627; G01M 15/00; Y02T 10/40; F02D 19/023; F02D 1/16; F02D 41/34; F02D 41/365; F02D 41/40; F02D 2001/0085; F02D 19/025; F02D 19/0623
USPC .... 701/101, 102, 114, 115; 123/406.62, 480
See application file for complete search history.

(56) References Cited

U.S. PATENT DOCUMENTS

| | | | | |
|---|---|---|---|---|
| 4,321,580 A | * | 3/1982 | Deleris ................... | F02P 7/061 340/870.24 |
| 4,936,277 A | * | 6/1990 | Deutsch ................ | F02D 35/027 123/436 |
| 6,560,528 B1 | * | 5/2003 | Gitlin .................. | F02D 41/2422 123/406.62 |

(Continued)

FOREIGN PATENT DOCUMENTS

KR  10-2003-0029367 A   4/2003

*Primary Examiner* — John Kwon
(74) *Attorney, Agent, or Firm* — Lempia Summerfield Katz LLC

(57) ABSTRACT

An engine synchronization method may include: detecting teeth numbers of crank teeth installed on a crankshaft based on a pulse signal generated from a crankshaft position sensor; calculating a tooth period between a falling edge and a next falling edge of the pulse signal generated from the crankshaft position sensor and detecting a missing tooth based on the calculated tooth period; determining whether the detected missing tooth is an actual missing tooth based on a tooth number detected at the time of detecting the missing tooth; and performing synchronization control of an engine when it is determined that the detected missing tooth is the actual missing tooth.

9 Claims, 8 Drawing Sheets

(56) References Cited

U.S. PATENT DOCUMENTS

2019/0078525 A1\* 3/2019 Kwon .................. F02D 41/222
2020/0032760 A1\* 1/2020 Han ....................... F02D 41/34

\* cited by examiner

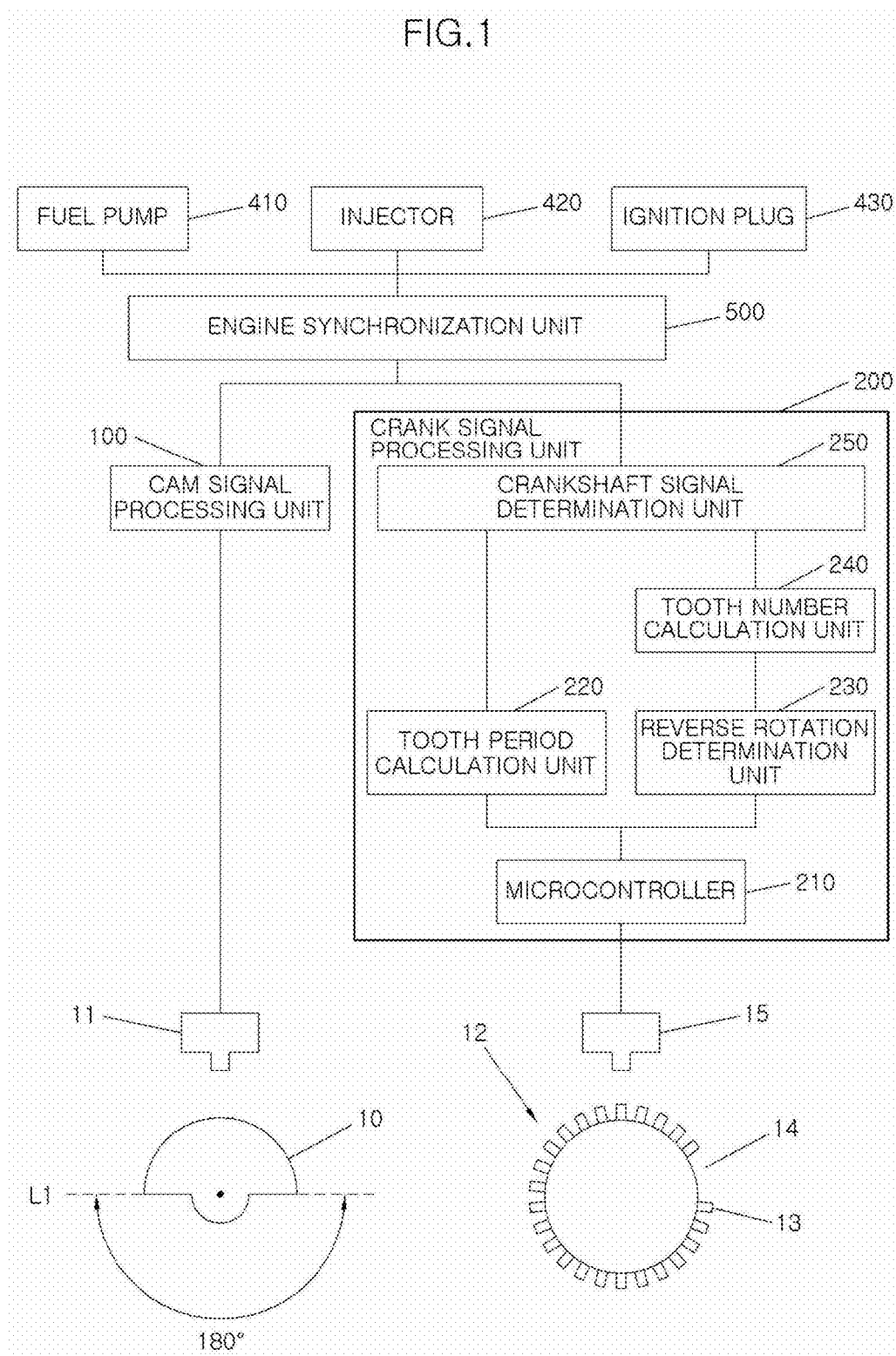

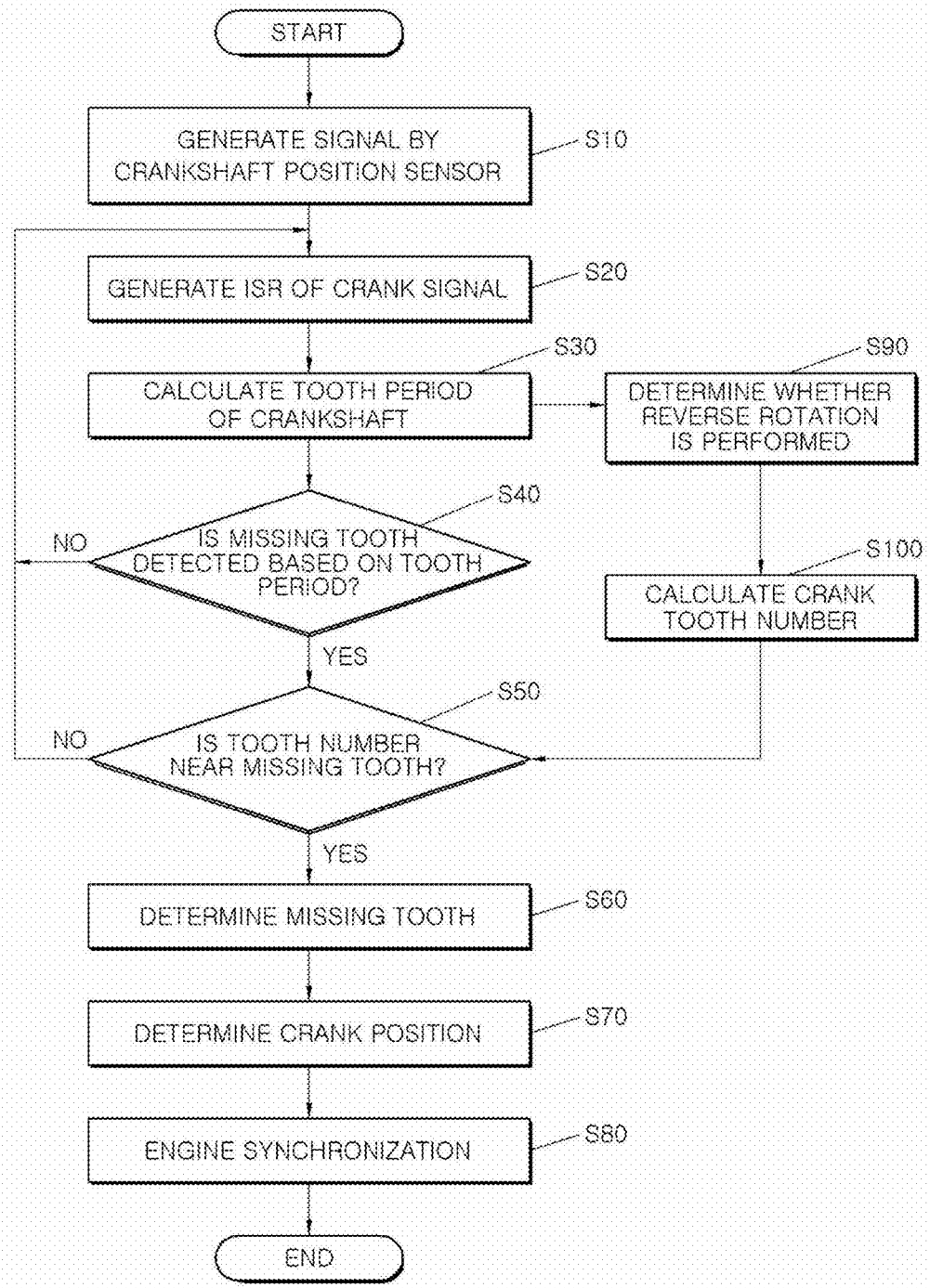

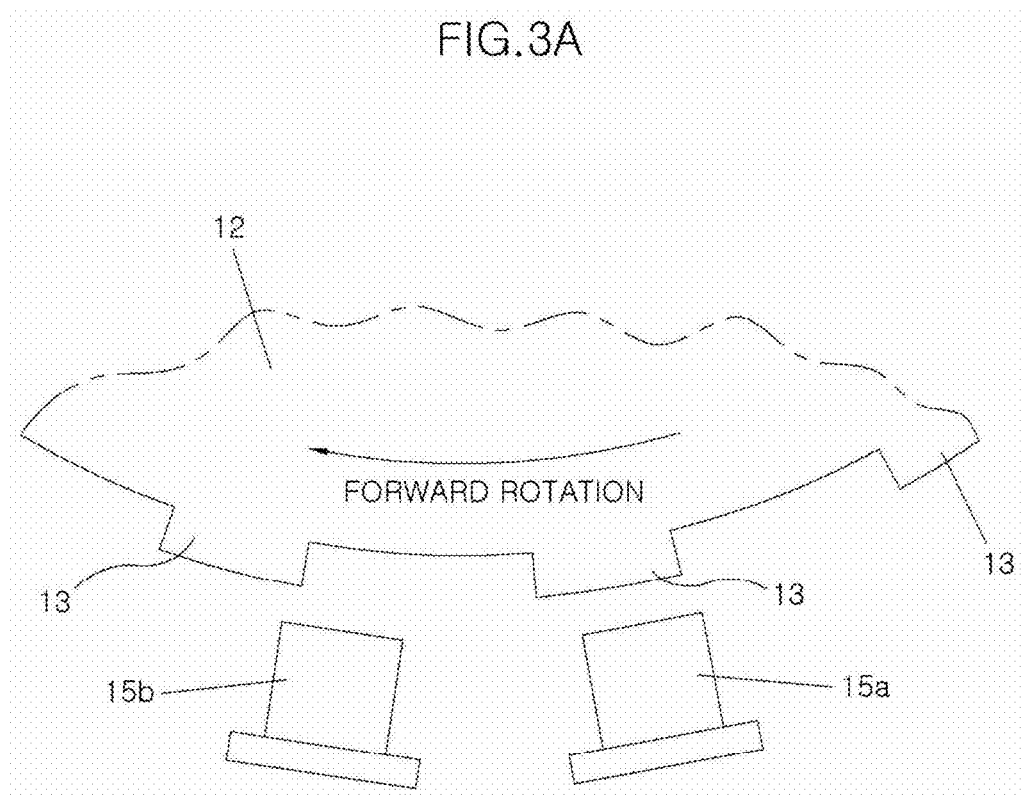

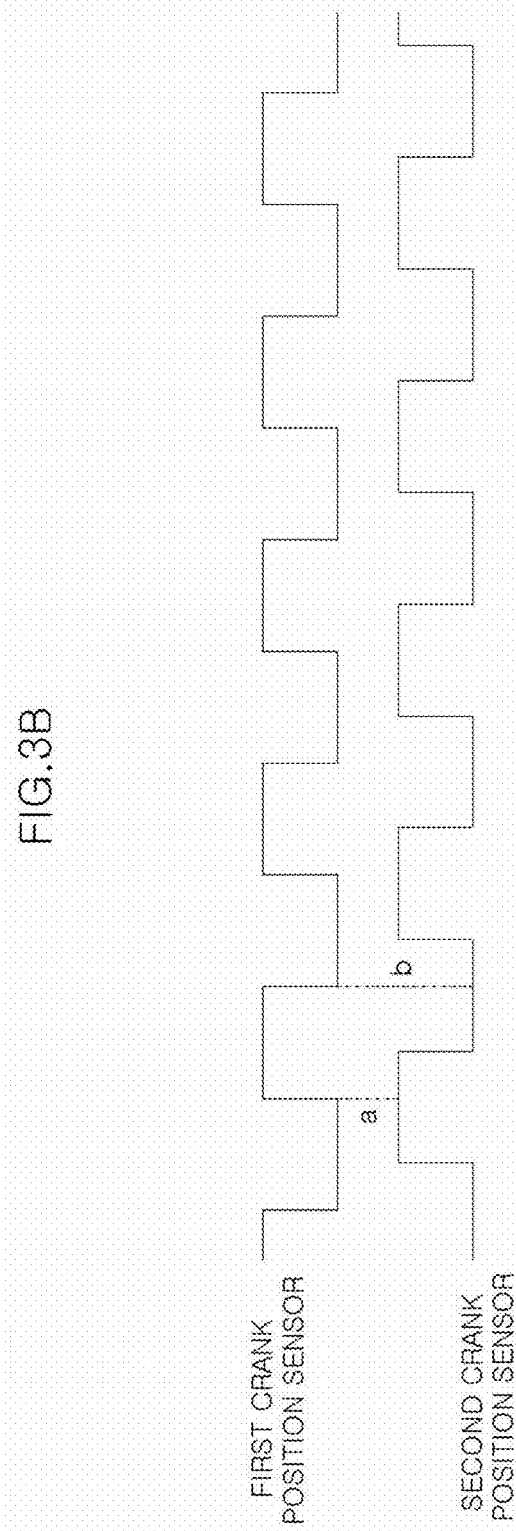

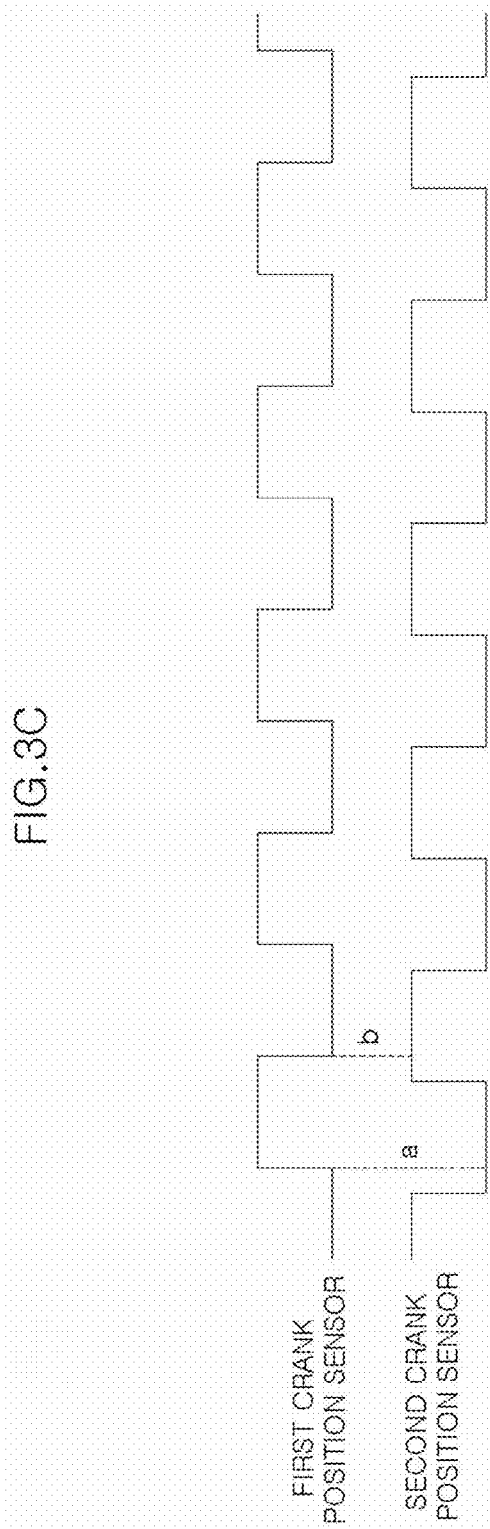

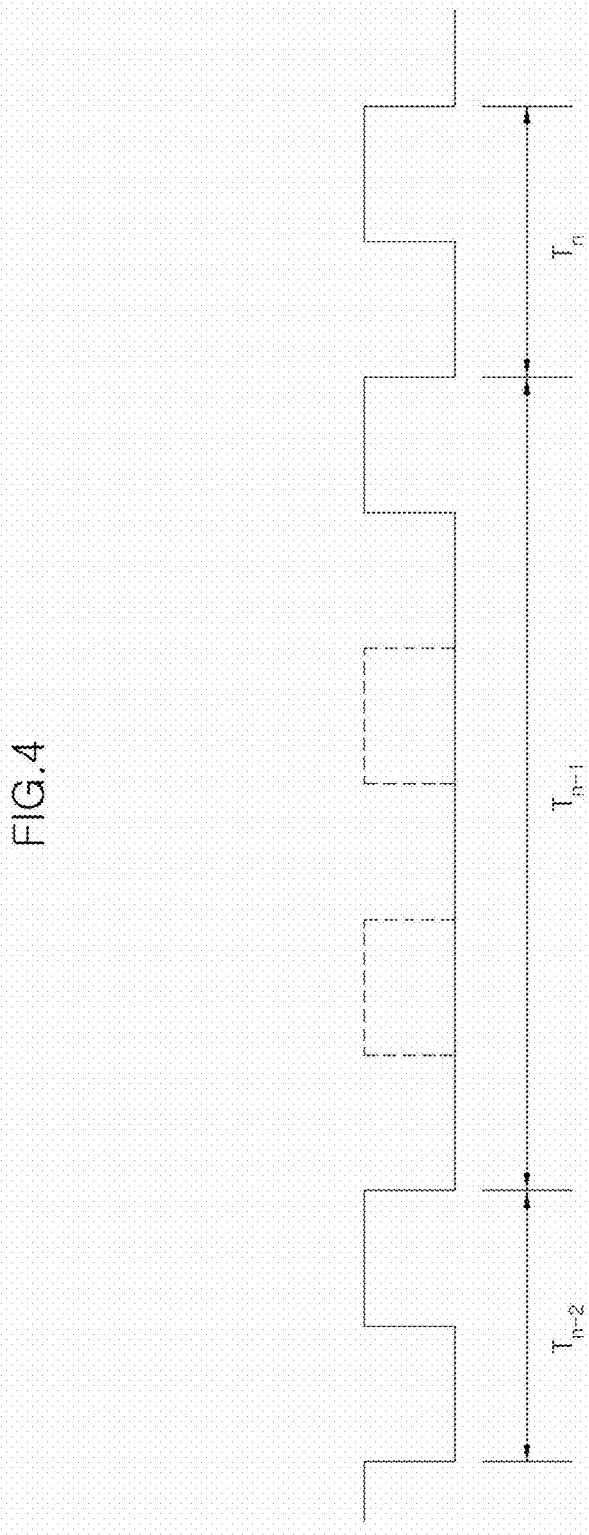

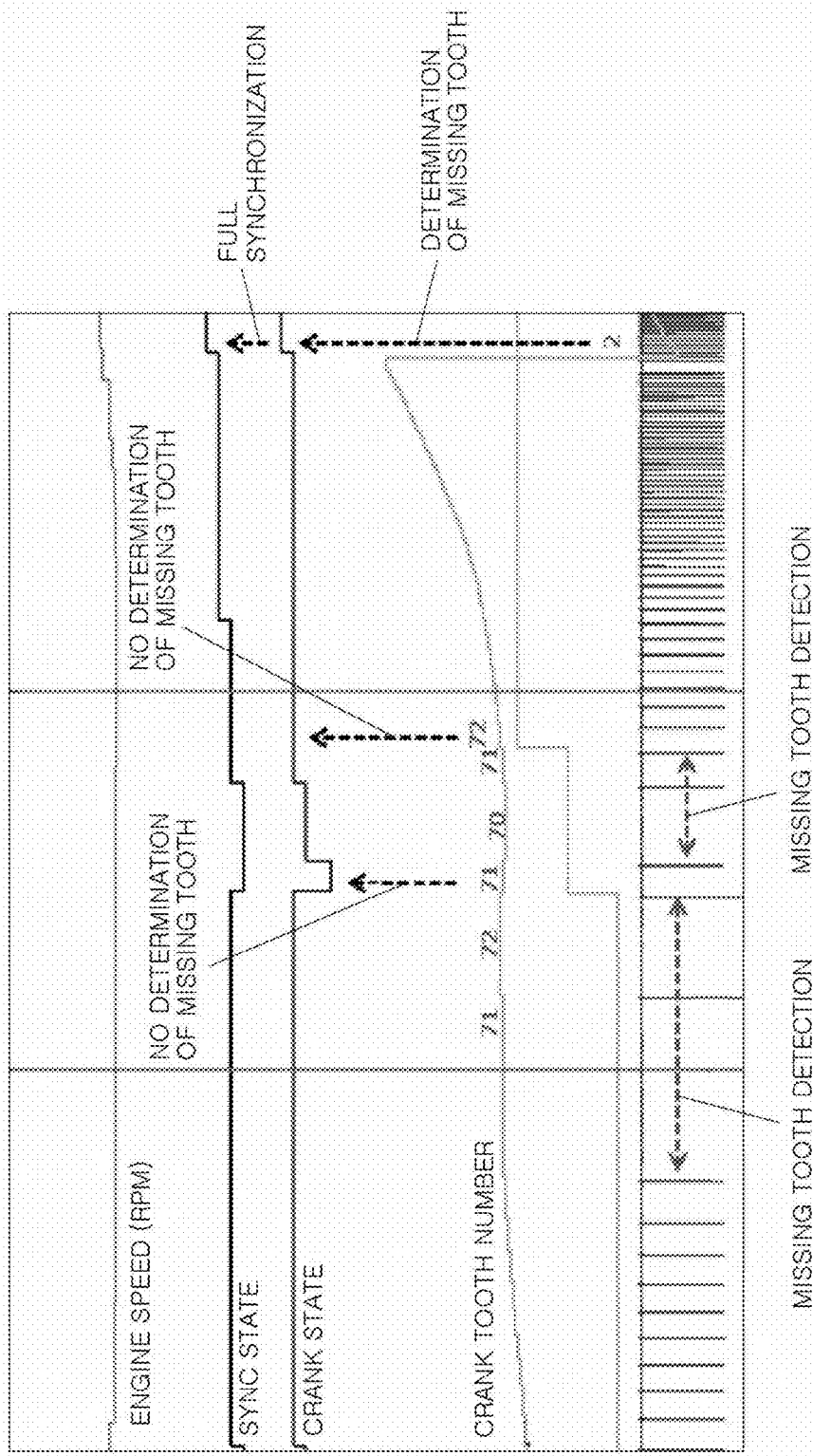

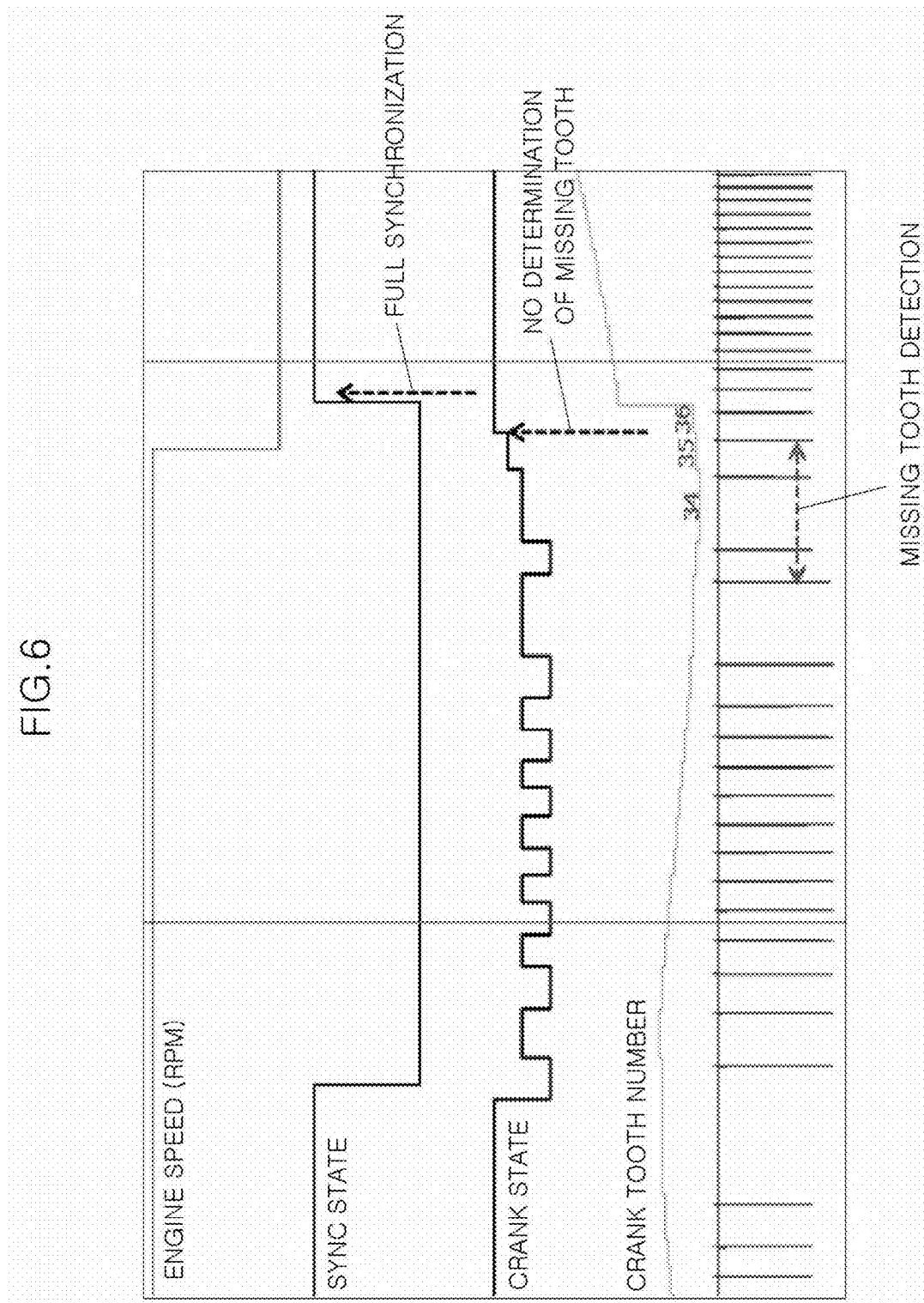

ENGINE SYNCHRONIZATION SYSTEM AND CONTROL METHOD THEREOF

CROSS-REFERENCE TO RELATED APPLICATION

This application claims priority to and the benefit of Korean Patent Application No. 10-2019-0025743, filed on Mar. 6, 2019, the entire contents of which are incorporated herein by reference.

FIELD

Exemplary forms of the present disclosure relate to an engine synchronization system and a control method thereof; and, particularly, to an engine synchronization system and a control method thereof, capable of preventing an error in determination of a crank angle when the crank angle is determined based on a crank signal from a crankshaft position sensor.

BACKGROUND

The statements in this section merely provide background information related to the present disclosure and may not constitute prior art.

A vehicle equipped with an internal combustion engine is adapted to control timings of fuel injection and ignition according to the driving condition or the like thereof. Particularly, in order to suppress the generation of noxious gas due to output reduction or incomplete combustion in a multi-cylinder engine, it is necessary to precisely synchronize the timings of fuel injection and ignition for each cylinder.

For such synchronization of the engine, it is necessary to accurately detect a rotational position of a crankshaft for each cylinder first of all. Korean Patent Application Publication No. 2003-0029367 (Apr. 14, 2003) discloses a conventional technology for detecting an accurate rotational position of a crankshaft. This conventional technology uses a crankshaft position sensor for the accurate position detection of the crankshaft, and a cam position sensor.

The crankshaft position sensor senses irregular teeth formed on the synchronous rotary body of the crankshaft to detect the angle of rotation and speed of the crankshaft and output them as pulse-type crank signals. The cam position sensor senses angle identification protrusions formed on the synchronous rotation body of the camshaft for intake and exhaust to detect the position of the camshaft and falling edge and the rising edge timings and output them as pulse-type cam signals. An electronic control unit (ECU) may check the position of the piston in each cylinder based on the crank signals and check which stroke the piston in each cylinder is in based on the cam signals. By means of this, the electronic control unit may control the timings of fuel injection and ignition for each cylinder.

In the case where a crankshaft position sensor 15 is used to specify a crank position (to synchronize a crankshaft), the crankshaft position sensor 15 detects the number of teeth 13, which are arranged on the outer circumference of a sensor wheel 12 provided coaxially with the crankshaft, and a missing tooth 14 to determine the crank position based on the result of detection in a crankshaft signal processing unit 200, as illustrated in FIG. 1.

In the case where a cam position sensor 11 is used to specify a cam position (to synchronize a cam 10), the cam position sensor 11 detects the edges of the cam 10 in intake and exhaust valves to specify the cam position from a combination of patterns of the cam edges in a cam signal processing unit 100.

An engine synchronization unit 300 finally performs the synchronization of the engine based on the synchronization information in the crankshaft signal processing unit 200 and the cam signal processing unit 100.

As described above, it is necessary to determine the position of the missing tooth 14 positioned on the outer circumference of the sensor wheel 12 in order to specify the crank position. To this end, the point of the missing tooth is conventionally determined using a tooth period T between a falling edge and a next falling edge in the pulse signal generated from the crankshaft position sensor, as illustrated in FIG. 4. For example, in a missing tooth without two teeth as illustrated in FIG. 4, it is determined that the missing tooth 14 is at a point of $T_{n-1}$ when the tooth period satisfies the following Equations (1) and (2):

$$(T_{n-2}) \times 2 < (T_{n-1}) \quad \text{Equation (1); and}$$

$$(T_{n-2}+T_n) < T_{n-1} < (T_{n-2}+T_n) \times 2.5 \quad \text{Equation (2)}$$

where $T_n$: the latest tooth period, $T_{n-1}$: an immediately preceding tooth period, and $T_{n-2}$: a tooth period before last.

However, we have discovered that when an engine start command is turned on and the crank signal is input while the engine is stalled, the tooth period may be input in a pattern of satisfying the above Equations (1) and (2) even though it is not an actual missing tooth point due to the reverse rotation of the crankshaft or the like, in which case the point of the missing tooth may be misrecognized. For example, the tooth periods of the last crank tooth in the previous operating cycle and the first and second crank teeth in the current operating cycle may be recognized like missing teeth.

FIG. 6 illustrates such a situation. In the example of FIG. 6, the actual missing teeth are positioned in the 2nd and 62th crank teeth of the sensor wheel 12. However, the tooth period near the 34th tooth was found to satisfy the above Equations (1) and (2) during the restart of the engine so that the crankshaft signal processing unit 200 determined the crank position based on the corresponding missing tooth point. The engine synchronization unit 300 performed full synchronization control based on the determined crank position. However, as a result of the inconsistency between the determined crank position and the actual crank position, the engine was synchronized based on the incorrect position, resulting in an error in the timings of fuel injection and ignition. Hence, the RPM of the engine is not increased and the engine fails to restart, in spite of the synchronization of the engine, as illustrated in FIG. 6.

Accordingly, we have found that when the determination of the missing tooth point depends only on the tooth period as in the related art, inputting the tooth period in a similar manner as the tooth period pattern of the missing tooth may cause erroneous determination as the missing tooth in spite of no actual missing tooth point. If the engine is synchronized based on such an erroneous determination, the fuel injection and ignition are performed at an incorrect position, which may fail to restart the engine or adversely affect fuel efficiency and durability of the engine.

SUMMARY

The present disclosure is directed to an engine synchronization system and a control method thereof, capable of preventing engine synchronization at an incorrect position by prohibiting erroneous determination of a non-missing tooth point as a missing tooth.

Other objects and advantages of the present disclosure can be understood by the following description, and become apparent with reference to the forms of the present disclosure. Also, it is obvious to those skilled in the art to which the present disclosure pertains that the objects and advantages of the present disclosure can be realized by the means as claimed and combinations thereof.

In one form of the present disclosure, an engine synchronization method includes: detecting teeth numbers of crank teeth installed on a crankshaft based on a pulse signal generated from a crankshaft position sensor, calculating a tooth period between a falling edge and a next falling edge of the pulse signal generated from the crankshaft position sensor and detecting a missing tooth based on the calculated tooth period, determining whether the detected missing tooth is an actual missing tooth based on a tooth number detected at the time of detecting the missing tooth, and performing synchronization control of an engine when it is determined that the detected missing tooth is the actual missing tooth.

According to another form of the present disclosure, it is possible to resolve the problem relating to the engine synchronization failure due to erroneous determination of the position of the missing tooth since even when the suspected position of the missing tooth is detected using the tooth period, the suspected position is not directly used for the engine synchronization but is checked using the crank tooth number.

The engine synchronization method may further include: detecting the teeth numbers of the crank teeth of the crankshaft until the engine is stopped using the crankshaft position sensor, and storing a tooth number of a crank tooth, among the crank teeth, detected immediately before the engine is stopped, as a stop tooth number, in a memory, and in detecting the teeth numbers of the crank teeth, a tooth number of a crank tooth initially detected by the crankshaft position sensor after the engine is restarted may be set to a value which is calculated by adding 1 to the stop tooth number stored immediately before the engine is stopped, and a tooth number for each crank tooth detected subsequently is counted based on the set tooth number.

According to another form, it is possible to assign a unique tooth number to a crank tooth even when the engine is stopped and then restarted.

The determining whether the detected missing tooth is an actual missing tooth may include determining the detected missing tooth as the actual missing tooth based on the tooth period of the crankshaft when a tooth number assigned at the time of detecting the missing tooth is within a predetermined range from a tooth number of a crank tooth where the actual missing tooth is positioned.

According to other form, even when some errors occur between the unique tooth number assigned to the crank tooth and the unique tooth number of the actual crank tooth as in the restart of the engine, the corresponding tooth number is usable to check the position of the missing tooth.

The engine synchronization method may further include determining whether the crankshaft rotates in a reverse direction, and when the reverse rotation of the crankshaft rotates is detected, in detecting the teeth numbers of the crank teeth, a number of teeth numbers may be subtracted, based on the pulse signal when the reverse rotation of the crankshaft rotates is detected, to count the teeth numbers for the crank teeth.

According to one form of the present disclosure, it is possible to assign a correct tooth number to the detected crank tooth even when the reverse rotation of the engine occurs.

In detecting the missing tooth based on the calculated tooth period, when a current tooth period ($T_n$), an immediately preceding tooth period ($T_{n-1}$), and a tooth period before last ($T_{n-2}$) satisfy the following Equations (1) and (2), it may be determined that a missing tooth exists in the immediately preceding tooth period ($T_{n-1}$):

$$(T_{n-2}) \times 2 < (T_{n-1}) \qquad \text{Equation (1); and}$$

$$(T_{n-2}+T_n) < T_{n-1} < (T_{n-2}+T_n) \times 2.5 \qquad \text{Equation (2).}$$

In the performing synchronization control of an engine, a crank angle may be specified by comparing the position of the determined missing tooth with a position of a cam edge detected from a cam position sensor for detecting an angle of a cam in intake and exhaust values, and the synchronization control of the engine may be performed by controlling a fuel injection timing and an ignition timing in a vehicle based on the specified crank angle.

In accordance with another form of the present disclosure, an engine synchronization system includes: a crankshaft signal processing unit configured to process crankshaft synchronization and detect a position of a crankshaft, based on a pulse signal detected from a crankshaft position sensor for detecting crank teeth and a missing tooth installed to the crankshaft; a cam signal processing unit configured to process cam synchronization and detect a position of a cam, based on a cam signal from a cam position sensor for detecting an edge corresponding to an angle of rotation of each of intake and exhaust cams interlocked with a rotary shaft of an engine; and an engine synchronization unit configured to synchronize the engine based on the crankshaft synchronization and the cam synchronization processed by the crankshaft signal processing unit and the cam signal processing unit, wherein the crankshaft signal processing unit includes a tooth period calculation unit configured to calculate a tooth period between a falling edge and a next falling edge of the pulse signal generated from the crankshaft position sensor, a tooth number calculation unit configured to calculate teeth numbers of the crank teeth of the crankshaft, and a crankshaft state determination unit configured to determine the missing tooth of the crankshaft by means of the tooth period calculation unit and the tooth number calculation unit.

The tooth number calculation unit may store a tooth number of a crank tooth detected immediately before the engine is stopped, as a stop tooth number, in a memory provided in a vehicle, set a tooth number of a crank tooth initially detected by the crankshaft position sensor when the engine is restarted to a value which is obtained by adding 1 to the stop tooth number stored immediately before the engine is stopped, and count a tooth number for each crank tooth detected subsequently based on the set tooth number.

The crankshaft state determination unit may detect the missing tooth based on the tooth period calculated by the tooth period calculation unit, and determine the detected missing tooth as an actual missing tooth based on the tooth period of the crankshaft when a tooth number assigned at the time of detecting the missing tooth is within a predetermined range from a tooth number of a crank tooth where the actual missing tooth is positioned.

The engine synchronization unit may determine a crank angle by comparing the position of the determined missing tooth with the position of the cam edge determined through the cam synchronization, and perform synchronization control of the engine by controlling a fuel injection timing and an ignition timing in the vehicle based on the determined crank angle.

The crankshaft signal processing unit may include a reverse rotation determination unit for determining whether the crankshaft rotates in a reverse direction, and the tooth number calculation unit may subtract a number of teeth numbers, based on the pulse signal when the reverse rotation of the crankshaft is detected by the reverse rotation determination unit, to count the teeth numbers for the crank teeth.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a block diagram illustrating an engine synchronization system according to one form of the present disclosure;

FIG. 2 is a flowchart illustrating an engine synchronization method according to one form of the present disclosure;

FIG. 3A is a view illustrating a detection means for determining whether a crankshaft rotates in a reverse direction;

FIG. 3B is a diagram illustrating a pulse signal generated by the detection means of FIG. 3A during the forward rotation of the crankshaft;

FIG. 3C is a diagram showing a pulse signal generated by the detecting means of FIG. 3A during the reverse rotation of the crankshaft;

FIG. 4 is a diagram illustrating a pulse signal generated from a crankshaft position sensor and illustrates a tooth period near a missing tooth;

FIG. 5 is a diagram illustrating an engine synchronization state when the engine synchronization method according to one form the present disclosure is performed; and FIG. 6 is a diagram illustrating an engine synchronization state when a conventional engine synchronization method is performed.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure may, however, be embodied in different forms and should not be construed as limited to the forms set forth herein. Rather, these forms are provided so that this disclosure will be thorough and complete, and will fully convey the scope of the present disclosure to those skilled in the art.

FIG. 1 is a block diagram illustrating an example of an engine synchronization system. Referring to FIG. 1, the engine synchronization system includes a cam signal processing unit 100, a crankshaft signal processing unit 200, and an engine synchronization unit 300.

The cam signal processing unit 100 detects the position of a cam 10 based on the cam signal from a cam position sensor 11 to process cam synchronization. The cam sensor 11 detects a cam edge at the time of rotation of the camshaft of the cam 10 in intake and exhaust valves and outputs it to the cam signal processing unit 100 as a pulse-type cam signal, the voltage phase of which is inverted between a high level H and a low level L. For example, the cam 10 is positioned above the line L1 indicated by the dotted line when the output of the cam sensor 11 is the high level H, whereas the cam 10 is positioned below the line L1 when the output of the cam sensor 11 is the low level L. Here, the cam 10 is provided to open and close the intake valve and the exhaust valve disposed in a combustion chamber, and the camshaft rotates in synchronization with the crankshaft.

The crankshaft signal processing unit 200 detects the position of the crankshaft by a crankshaft position sensor 15 to process crankshaft synchronization. The crankshaft position sensor 15 is disposed in the vicinity of a sensor wheel 12 provided coaxially with the crankshaft. The sensor wheel 12 has a plurality of crank teeth 13 formed along the outer circumference thereof. The crankshaft position sensor 15 senses the irregular crank teeth 13 to detect the angle of rotation and speed of the crankshaft and outputs the result of detection to the crankshaft signal processing unit 200 as a pulse-type crank signal. In this case, the teeth are not formed throughout the circumference of the sensor wheel 12 but a portion of the teeth is missing therefrom. The crank signal processing unit 200 determines this missing portion as a missing tooth 14 to determine the crank position based on the corresponding position.

In one form of the present disclosure, the crankshaft signal processing unit 200 includes a microcontroller 210, a tooth period calculation unit 220, a reverse rotation determination unit 230, a tooth number calculation unit 240, and a crankshaft signal determination unit 250.

The microcontroller 210 receives a pulse signal from the crankshaft position sensor 15 and generates an interrupt service routine (hereinafter, referred to as "ISR") according to the signal characteristics of the pulse signal.

The tooth period calculation unit 220 receives ISR information from the microcontroller 210 and continuously calculates a tooth period between a falling edge and a next falling edge in the pulse signal based on the received ISR information for each crank tooth.

The reverse rotation determination unit 230 receives ISR information from the microcontroller 210 and determines whether the crankshaft rotates in a reverse direction or a forward direction based on the received ISR information. Whether the crankshaft rotates in the reverse direction may be determined through a change in the tooth period T or may be determined through a change in the pulse width of the pulse signal. Alternatively, it is also possible using a plurality of crankshaft positions sensors as described below. Hereinafter, a method will be described of detecting the reverse rotation of the crankshaft through the plurality of crankshaft position sensors 15a and 15b.

FIG. 3A illustrates a detection means for determining whether the crankshaft rotates in the reverse direction. FIG. 3B is a diagram illustrating a pulse signal generated by the detection means of FIG. 3A during the forward rotation of the crankshaft. FIG. 3C is a diagram showing a pulse signal generated by the detecting means of FIG. 3A during the reverse rotation of the crankshaft.

As illustrated in FIG. 3A, a first crank position sensor 15a and a second crank position sensor 15b may be disposed at regular intervals, as the crankshaft position sensor, to determine whether the crankshaft rotates in the reverse direction. Since the first crank position sensor 15a and the second crank position sensor 15b are disposed at regular intervals, the pulse signals measured from the first and second crank position sensors 15a and 15b also have a certain phase difference as illustrated in FIGS. 3B and 3C.

For example, as illustrated in FIG. 3B, during the forward rotation of the crankshaft, the pulse signal from the second crank position sensor 15b is in a rising state at the rising edge (a) of the pulse signal from the first crank position sensor 15a, whereas the pulse signal from the second crank position sensor 15b is in a falling state at the falling edge (b) of the pulse signal from the first crank position sensor 15a. In this case, when the crankshaft rotates in the reverse direction, the phase difference between the pulse signals measured from the first and second crank position sensors 15a and 15b changes. Thus, as illustrated in FIG. 3C, the pulse signal from the second crank position sensor 15b is in a falling state at the rising edge (a) of the pulse signal from the first crank position sensor 15a, whereas the pulse signal from the second crank position sensor 15b is in a rising state at the falling edge (b) of the pulse signal from the first crank position sensor 15a. As such, it is possible to determine whether the crankshaft rotates in the reverse or forward direction using the phase difference between the pulse signals from the two crank position sensors.

The tooth number calculation unit 240 receives ISR information from the microcontroller 210 and information about whether the crankshaft rotates in the reverse direction from the reverse rotation determination unit 230, and calculates a unique tooth number of the crank tooth 13 detected at this point in time.

Specifically, in order to assign a unique tooth number to each crank tooth 13, the tooth number calculation unit 240 may assign a tooth number to each of the crank teeth 13 after the already numbered tooth by increasing the already determined tooth number by 1 whenever the rising edge of the pulse signal corresponding to the associated crank tooth 13 is detected. For example, when the position of any missing tooth 14 is determined in the previous engine cycle, the tooth numbers of the crank teeth 13 at the position of the determined missing tooth 14 are known values (e.g., 2nd and 62th teeth in FIG. 6 as described above). Therefore, a tooth number is assigned to each of the crank teeth detected after the associated crank tooth 13 by increasing the tooth number of the associated tooth by 1.

In one form, the tooth number calculation unit 240 stores the tooth number of the crank tooth 13 finally detected immediately before the engine is stopped, as a stop tooth number, in a memory provided in the vehicle, sets the tooth number of the crank tooth 13 initially detected by the crankshaft position sensor 15 when the engine is restarted, to a value obtained by adding 1 to the stop tooth number stored immediately before the engine is stopped, and counts the tooth number for each crank tooth 13 detected subsequently based on the associated tooth number. In this case, even when the engine is stopped and then restarted, the unique number of the detected crank tooth 13 may be checked and used to determine the crank position.

Meanwhile, when the crankshaft rotates in the reverse direction, the tooth number assigned by detecting the rising edge or the falling edge of the pulse signal does not coincide with the unique tooth number of the actual tooth. Therefore, when the reverse rotation determination unit 230 determines that the crankshaft rotates in the reverse direction, the tooth number calculation unit 240 corrects the tooth number by reflecting it.

More specifically, the tooth number calculation unit 240 subtracts the number of tooth numbers based on the pulse signal detected when the reverse rotation determination unit 230 determines that the crankshaft rotates in the reverse direction, and counts the tooth number for the crank tooth. For example, when the tooth number is counted five times from the stop tooth number and the tooth number is counted twice during the reverse rotation, the tooth number obtained by adding the three-times counted tooth number subtracting the twice counted tooth number to the stop tooth number may be set to a current tooth number. For example, in the example of FIG. 5, the crank tooth detected after the crankshaft is determined to rotate in the reverse direction after the detection of the 72th crank took has a tooth number of 71 instead of 73.

The crank signal determination unit 250 determines a missing tooth point based on the tooth period T and the tooth number calculated by the respective tooth period calculation unit 220 and tooth number calculation unit 240. To this end, the crank signal determination unit 250 first detects a suspected missing tooth point based on the tooth period calculated by the tooth period calculation unit 220. For example, as illustrated in FIG. 4, it may be determined that a missing tooth without two teeth is at a point of $T_{n-1}$ when the tooth period satisfies the following Equations (1) and (2):

$$(T_{n-2}) \times 2 < (T_{n-1}) \qquad \text{Equation(1); and}$$

$$(T_{n-2}+T_n) < T_{n-1} < (T_{n-2}+T_n) \times 2.5 \qquad \text{Equation (2)}$$

where $T_n$: the latest tooth period, $T_{n-1}$: an immediately preceding tooth period, and $T_{n-2}$: a tooth period before last.

However, as described above, the suspected point of the missing tooth 14 may not coincide with a position where the actual missing tooth 14 exists, depending on the operating state of the engine. Therefore, in order to determine that the suspected point of the missing tooth 14 is a position where the actual missing tooth 14 exists, the crank signal determination unit 250 uses the tooth number calculated by the tooth number calculation unit 240.

Specifically, the crank signal determination unit 250 determines the missing tooth detected using the tooth period of the crankshaft as an actual missing tooth 14, when the tooth number assigned to the crank tooth 13 by tooth number calculation unit 240 at the time of detecting the suspected point of the missing tooth 14 is within a predetermined range from the tooth number of the crank tooth (13) on which the actual missing tooth 14 is positioned.

For example, in the example of FIG. 5, the unique numbers of the teeth at the point where the actual missing tooth 14 exists are 2 and 62. Therefore, when the tooth number assigned to the tooth at the suspected point of the missing tooth 14 is 2 or 62, the detected suspected missing tooth point may be determined as an actual missing tooth position. In addition, in the restart process of the engine, some errors may occur between the unique tooth number of the crank tooth 13 and the tooth number assigned by the tooth number calculation unit 240. Therefore, in consideration of this, the suspected point of the detected missing tooth 14 may be determined as the position of the actual missing tooth 14 even when the tooth number is within a predetermined range (e.g., within numbers 2 and 3) from the unique number (2 or 62 in the example of FIG. 5) of the crank tooth 13 at the point where the missing tooth 14 exists. If a tooth number, which is out of a predetermined range from the unique number of the tooth at the point where the missing tooth 14 exists, is assigned to the associated crank tooth 13, the suspected point of the missing tooth 14 is not determined as the position of the actual missing tooth 14, but the position determination of the missing tooth is postponed until the suspected point of the next missing tooth 14 is detected. In the example of FIG. 5, the suspected position of the missing tooth 14 is detected at a 71th tooth based on the tooth period calculated by the tooth period calculation unit 220, but the crankshaft signal determination unit does not determine a missing tooth position since the 71th tooth is out of the predetermined range from the teeth (numbers 2 and 62) at the point where the actual missing tooth is positioned. Meanwhile, when the missing tooth 14 is determined, the crank signal determination unit 250 determines a current crank position (crank angle) based on the determined missing tooth 14.

The engine synchronization unit 500 performs engine synchronization based on the cam synchronization and the crankshaft synchronization processed by the cam signal processing unit 100 and the crankshaft signal processing unit 200. The engine synchronization unit 500 performs control to synchronize a fuel injection timing and an ignition timing for each cylinder of the engine by controlling a high-pressure fuel pump 410, an injector 420, and an ignition plug 430 (in the gasoline engine) based on the crank position and cam position information determined through the cam synchronization and the crank synchronization.

FIG. 2 is a flowchart illustrating an engine synchronization method according to one form of the present disclosure.

As illustrated in FIG. 2, when an engine rotates, a crankshaft position sensor 15 generates an electric signal in the form of a specific pulse pattern according to the rotation of a sensor wheel 12 formed with crank teeth 13 (S10).

The pulse signal generated by the crankshaft position sensor 15 is transmitted to a microcontroller 210 of a crank signal processing unit 200, and the microcontroller 210 generates an interrupt service routine (ISR) according to the signal characteristics of the pulse signal (S20).

The ISR information generated by the microcontroller 210 is transmitted to both of a tooth period calculation unit 220 and a tooth number calculation unit 230 to calculate a tooth period T and a tooth number.

As described above, the tooth period calculation unit 220 calculates the time required between a falling edge and a next falling edge as the tooth period T for each specific pulse detected from the ISR information (S30).

The tooth number calculation unit 240 assigns a counted tooth number to the crank tooth 13 corresponding to the point where the rising edge or the falling edge of the pulse signal is detected, based on the ISR information (S100). In another form, in step S100, when the engine is stalled and then restarted, the tooth number calculation unit 240 stores the tooth number of the crank tooth 13, finally counted immediately before the engine is stopped, as a stop tooth number, in a memory, sets the tooth number of the crank tooth 13 initially detected by the crankshaft position sensor 15 when the engine is restarted, to a value obtained by adding 1 to the stop tooth number stored immediately before the engine is stopped, and counts the tooth number for each crank tooth detected subsequently based on the associated tooth number.

Meanwhile, when the crankshaft rotates in the reverse direction, the tooth number counted by the tooth number calculation unit 240 may not coincide with the unique number of the actual corresponding tooth. Therefore, it is preferable to first determine whether the crankshaft rotates in the reverse direction, based on the ISR information, before counting the tooth number (S90). When it is determined that the crankshaft rotates in the reverse direction in S90, the number of tooth numbers is subtracted based on the pulse signal when the reverse rotation of the crankshaft is detected to count the tooth number of the detected tooth 13 in S100.

Meanwhile, when the tooth period T is calculated in S30, the crankshaft signal determination unit 250 detects a suspected missing tooth point based on the calculated tooth period T (S40). When the suspected missing tooth point is detected by calculating the tooth period T, the crankshaft signal determination unit 250 determines whether to determine the corresponding suspected point as a position of the missing tooth 14 based on the tooth number counted in S100. For example, as described above, it is determined whether the tooth number assigned at the time of detecting the suspected point of the missing tooth 14 is within a predetermined range from the tooth number of the crank tooth 13 where the actual missing tooth 14 is positioned (S50).

If the tooth number assigned at the time of detecting the suspected point of the missing tooth 14 is within the predetermined range from the tooth number of the crank tooth 13 where the actual missing tooth 14 is positioned, the suspected point of the detected missing tooth 14 is determined as the position of the actual missing tooth 14 based on the tooth period T of the crankshaft (S60).

On the other hand, when the tooth number assigned at the time of detecting the suspected point of the missing tooth 14 is out of the predetermined range from the tooth number of the crank tooth 13 where the actual missing tooth 14 is positioned in S50, as illustrated in FIG. 5, the position of the missing tooth 14 is not determined, but the suspected point of another missing tooth 14 is detected again based on the ISR information (S40).

When the position of the missing tooth is determined in S60, the crankshaft signal determination unit 250 determines a current crank position (crank angle) based on the determined position of the missing tooth 14 (S70).

An engine synchronization unit 500 performs engine synchronization based on the cam synchronization and the crankshaft synchronization processed by the cam signal processing unit 100 and the crankshaft signal processing unit 200. The engine synchronization unit 500 performs control to synchronize a fuel injection timing and an ignition timing for each cylinder of the engine by controlling a high-pressure fuel pump 410, an injector 420, and an ignition plug 430 (in the gasoline engine) based on the crank position and cam position information determined through the cam synchronization and the crank synchronization.

FIG. 5 is a diagram illustrating an engine synchronization state when the engine synchronization method is performed. As illustrated in FIG. 5, according to the engine synchronization method of the present disclosure, the position of the missing tooth 14 is not determined even when the suspected position of the missing tooth 14 is detected at the position of the crank tooth 13 having the tooth number different from the unique tooth number (2 or 62) of the crank tooth 13 on which the actual missing tooth 14 is positioned, but the position of the missing tooth 14 is determined when the suspected point of the missing tooth 14 is detected at the position of the crank tooth 13 having the tooth number coinciding with the unique tooth number (2 or 62) of the crank tooth or adjacent thereto. In this case, it is possible to prevent the engine synchronization based on the erroneous crank position. Therefore, it is possible to improve the start performance of the engine and to prevent deterioration in fuel efficiency and engine durability due to the error in timings of fuel injection and ignition.

In accordance with exemplary forms of the present disclosure, it is possible to prevent engine synchronization at an incorrect position by determining a missing tooth with reference to the tooth number without directly determining a suspected missing tooth point as the missing tooth even when the suspected missing tooth point is detected based on the detected tooth period.

This makes it possible to improve the start performance of the engine and engine durability and to prevent deterioration in fuel efficiency due to the error in timings of fuel injection and ignition.

While the present disclosure has been described with respect to the specific forms, it will be apparent to those skilled in the art that various changes and modifications may be made without departing from the spirit and scope of the present disclosure.

What is claimed is:

1. An engine synchronization method comprising:
   detecting teeth numbers of crank teeth installed on a crankshaft based on a pulse signal generated from a crankshaft position sensor;
   calculating a tooth period between a falling edge and a next falling edge of the pulse signal generated from the crankshaft position sensor and detecting a missing tooth based on the calculated tooth period;
   determining whether the detected missing tooth is an actual missing tooth based on a tooth number detected at a time of detecting the missing tooth;
   determining the detected missing tooth as the actual missing tooth based on the tooth period of the crankshaft when the tooth number assigned at the time of detecting the missing tooth is within a predetermined range from a tooth number of a crank tooth where the actual missing tooth is positioned; and
   performing synchronization control of an engine when it is determined that the detected missing tooth is the actual missing tooth.

2. The engine synchronization method of claim 1, further comprising:
   detecting the teeth numbers of the crank teeth of the crankshaft until the engine is stopped using the crankshaft position sensor; and
   storing a tooth number of a crank tooth, among the crank teeth, detected immediately before the engine is stopped, as a stop tooth number, in a memory,
   wherein in detecting the teeth numbers of the crank teeth, a tooth number of a crank tooth, among the crank teeth, initially detected by the crankshaft position sensor right after the engine is restarted is set to a value which is calculated by adding 1 to the stop tooth number stored immediately before the engine is stopped, and
   wherein a tooth number for each crank tooth detected subsequently is counted based on the set tooth number.

3. The engine synchronization method of claim 2, further comprising determining whether the crankshaft rotates in a reverse direction,
   wherein in detecting the tooth numbers of the crank teeth, a number of teeth numbers is subtracted, based on the pulse signal when the reverse rotation of the crankshaft rotates is detected, to count the teeth numbers for the crank teeth.

4. The engine synchronization method of claim 1, wherein in detecting the missing tooth based on the calculated tooth period, when a current tooth period ($T_n$), an immediately preceding tooth period ($T_{n-1}$), and a tooth period before last ($T_{n-2}$) satisfy the following Equations (1) and (2), it is determined that the missing tooth exists in the immediately preceding tooth period ($T_{n-1}$):

$$(T_{n-2}) \times 2 < (T_{n-1}) \qquad \text{Equation (1); and}$$

$$(T_{n-2}+T_n) < T_{n-1} < (T_{n-2}+T_n) \times 2.5 \qquad \text{Equation (2).}$$

5. The engine synchronization method of claim 1, wherein in performing synchronization control of the engine, a crank angle is specified by comparing a position of the determined missing tooth with a position of a cam edge detected by a cam position sensor configured to detect an angle of a cam in intake and exhaust values, and the synchronization control of the engine is performed by controlling a fuel injection timing and an ignition timing in a vehicle based on the specified crank angle.

6. An engine synchronization system comprising:
   a crankshaft signal processing unit configured to process crankshaft synchronization and detect a position of a crankshaft, based on a pulse signal detected from a crankshaft position sensor configured to detect crank teeth and a missing tooth installed on the crankshaft;
   a cam signal processing unit configured to process cam synchronization and detect a position of a cam, based on a cam signal from a cam position sensor configured to detect an edge corresponding to an angle of rotation of each of intake and exhaust cams interlocked with a rotary shaft of an engine; and
   an engine synchronization unit configured to synchronize the engine based on the crankshaft synchronization and the cam synchronization processed by the crankshaft signal processing unit and the cam signal processing unit,
   wherein the crankshaft signal processing unit comprises:
   a tooth period calculation unit configured to calculate a tooth period between a falling edge and a next falling edge of the pulse signal generated from the crankshaft position sensor;
   a tooth number calculation unit configured to calculate teeth numbers of the crank teeth of the crankshaft; and
   a crankshaft state determination unit configured to determine the missing tooth of the crankshaft by means of the tooth period calculation unit and the tooth number calculation unit,
   wherein the crankshaft state determination unit is configured to:
   detect the missing tooth based on the tooth period calculated by the tooth period calculation unit, and
   determine the detected missing tooth as an actual missing tooth based on the tooth period of the crankshaft when a tooth number assigned at a time of detecting the missing tooth is within a predetermined range from a tooth number of a crank tooth where the actual missing tooth is positioned.

7. The engine synchronization system of claim 6, wherein the tooth number calculation unit is configured to:
   store a tooth number of a crank tooth, among the crank teeth, detected immediately before the engine is stopped, as a stop tooth number, in a memory provided in a vehicle,
   set a tooth number of a crank tooth, among the crank teeth, initially detected by the crankshaft position sensor after the engine is restarted to a value which is calculated by adding 1 to the stop tooth number stored immediately before the engine is stopped, and count a tooth number for each crank tooth detected subsequently based on the set tooth number.

8. The engine synchronization system of claim 6, wherein the engine synchronization unit is configured to:
determine a crank angle by comparing the position of the determined missing tooth with a position of the cam edge determined through the cam synchronization, and
perform synchronization control of the engine by controlling a fuel injection timing and an ignition timing in the vehicle based on the determined crank angle.

9. The engine synchronization system of claim 6, wherein:
the crankshaft signal processing unit comprises a reverse rotation determination unit configured to determine whether the crankshaft rotates in a reverse direction; and
the tooth number calculation unit subtracts a number of teeth numbers, based on the pulse signal when the reverse rotation of the crankshaft is detected by the reverse rotation determination unit, to count the teeth numbers for the crank teeth.

\* \* \* \* \*